Aug. 11, 1959 S. W. ALDERFER ET AL 2,898,626
METHOD AND APPARATUS FOR FORMING FOAMED MATERIAL
Filed Oct. 10, 1955 3 Sheets-Sheet 2
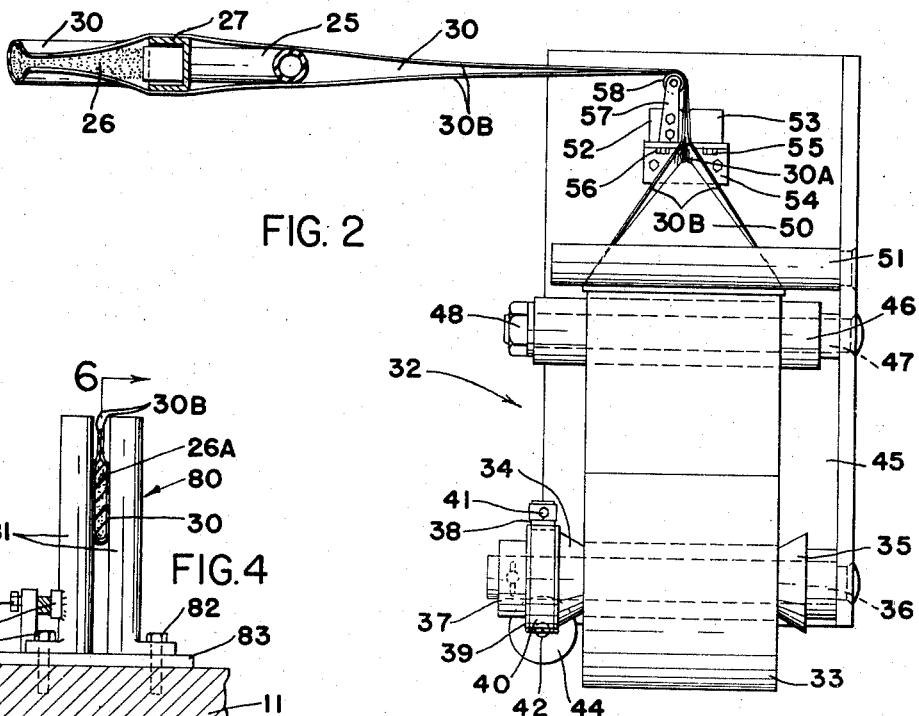
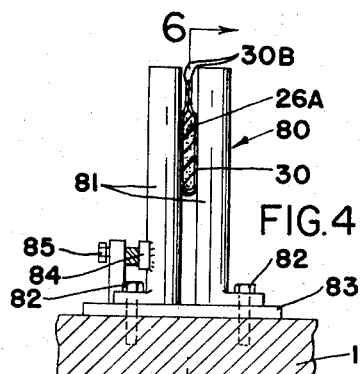
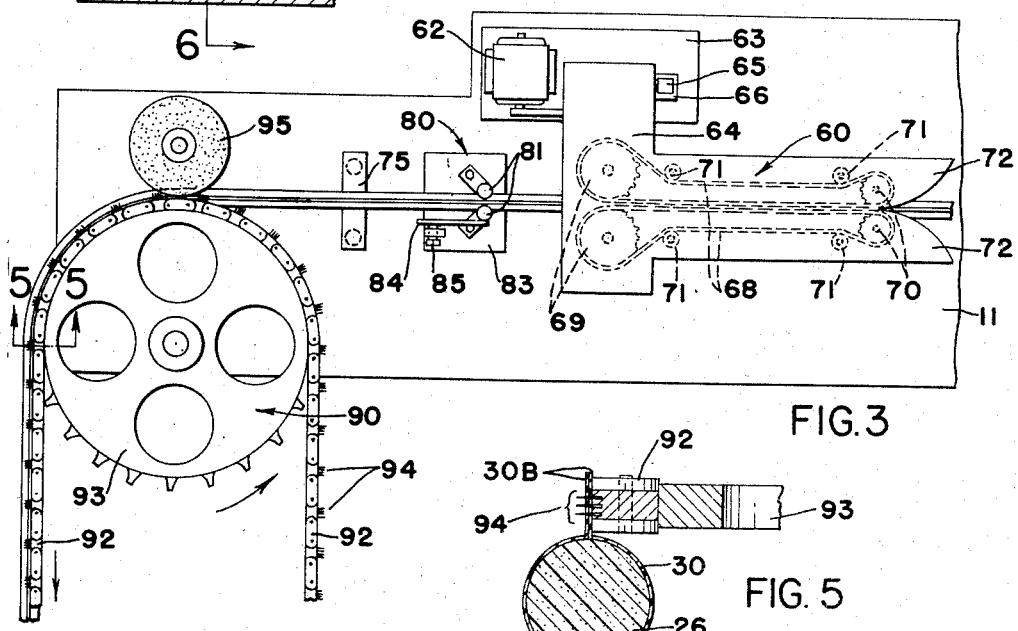
INVENTORS
STERLING W. ALDERFER &
BY HARRY D. BODLEY
ATTORNEYS Aug. 11, 1959 S. W. ALDERFER ET AL 2,898,626
METHOD AND APPARATUS FOR FORMING FOAMED MATERIAL
Filed Oct. 10, 1955 3 Sheets-Sheet 3

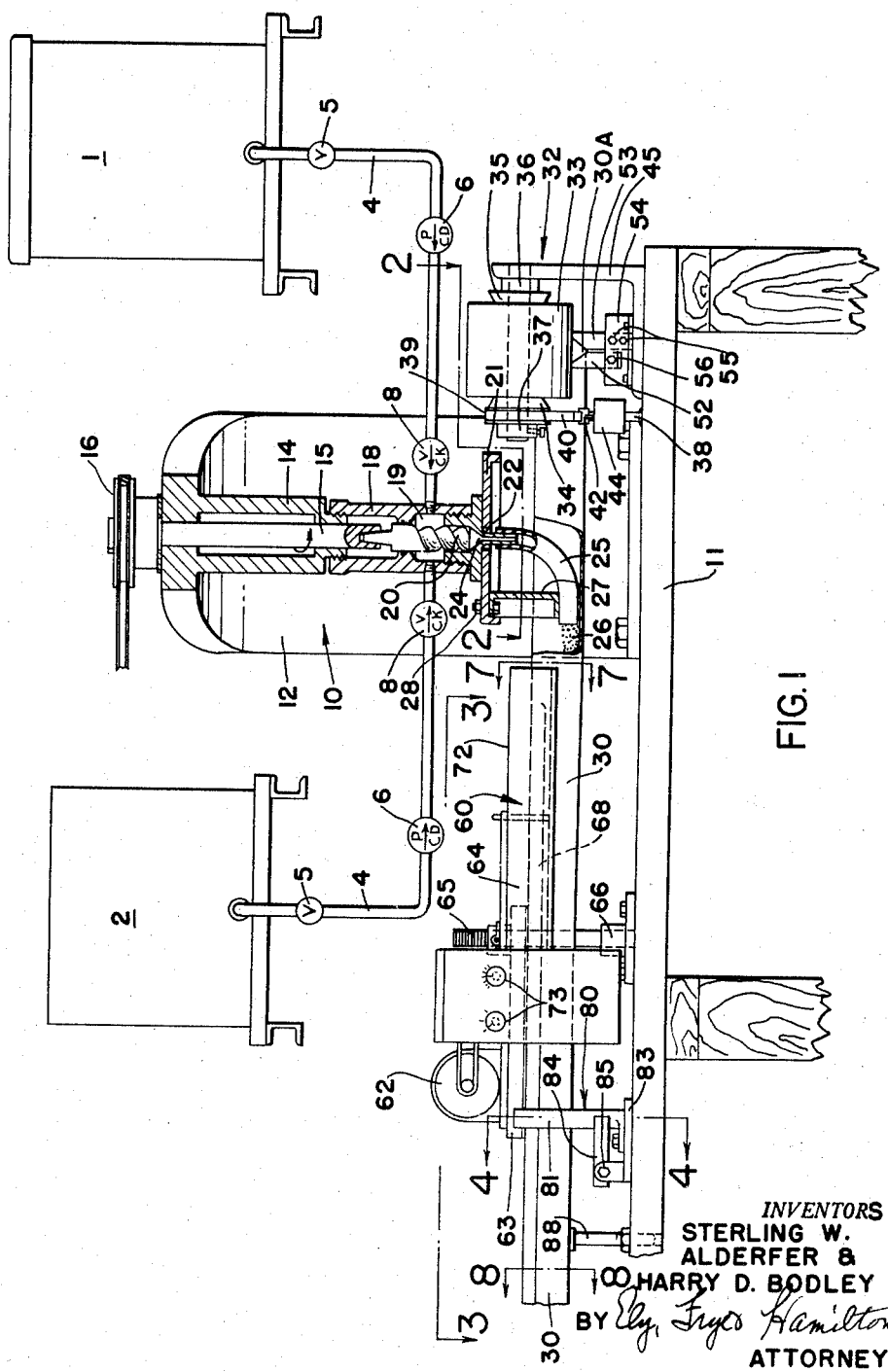

INVENTORS
STERLING W. ALDERFER &
BY HARRY D. BODLEY

ATTORNEYS

United States Patent Office 2,898,626
Patented Aug. 11, 1959

2,898,626

METHOD AND APPARATUS FOR FORMING FOAMED MATERIAL

Sterling W. Alderfer and Harry D. Bodley, Akron, Ohio, assignors, by direct and mesne assignments, to Sterling Alderfer Company, Akron, Ohio, a corporation of Ohio Application October 10, 1955, Serial No. 539,421

11 Claims. (Cl. 18—4)

The present invention relates to the manufacture of a resilient foam article especially adapted for use as a gasket or sealing material. More particularly, the invention relates to the manufacture of a foam material by the reaction of suitable chemical compounds while contained within a closed casing or jacket.

Heretofore, resilient foam materials have been produced by either open or "continuous-slab" molding techniques or in heavy, closed molds adapted from apparatus used for the molding of plastisols or elastomers. It has not been possible heretofore to satisfactorily produce, especially in a continuous manner, resilient foams having a uniform and relatively small cross-sectional area. Nor, has it been possible to continuously produce a resilient foam material contained within an outer jacket; which jacket may be removed completely, used to protect the resilient foam core, or have a decorative surface; whichever may be desired.

It is an object of the present invention to produce a resilient foam material especially suited for use as a gasket or sealing material.

Further, it is an object to provide an improved method for forming a resilient foam material within a closed casing or jacket of a suitable material.

Still further, it is an object to provide improved apparatus for continuously reacting chemical compounds contained within a closed casing or jacket so as to form a novel resilient foam material.

These and other objects, as well as the advantages, will be apparent in view of the following disclosure taken in conjunction with the drawings.

In the drawings:

Fig. 1 is a schematic view in elevation of a preferred form of apparatus suitable for the practice of the invention.

Fig. 2, taken substantially on line 2—2 of Fig. 1, is an enlarged fragmentary plan view of the entry end of the apparatus.

Fig. 3 is a plan view, taken substantially on line 3—3 of Fig. 1, and additionally shows a means for receiving and supporting the resilient foam article while the reaction forming same runs substantially to completion.

Fig. 4 is a view taken substantially on line 4—4 of Figs. 1 and 6.

Fig. 5 is an enlarged partial section taken substantially on line 5—5 of Fig. 3.

Figure 6:
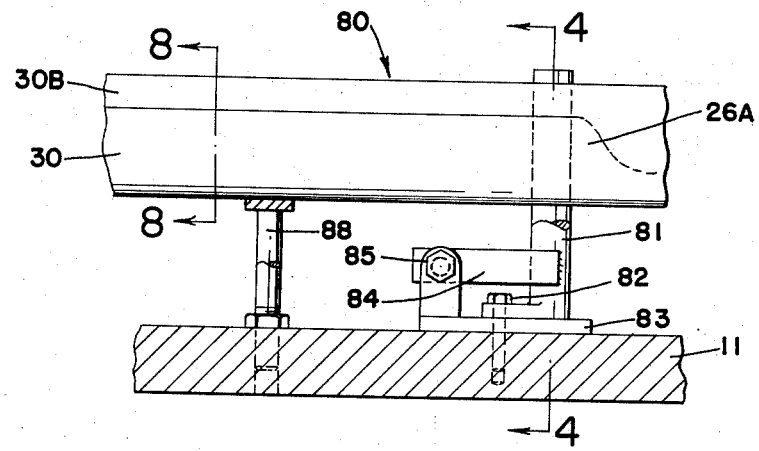
Fig. 6 is a partial elevation taken substantially on line 6—6 of Fig. 4.
Figure 7:
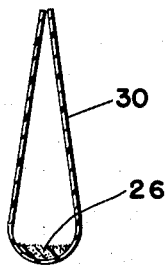
Fig. 7 is an enlarged partial section taken substantially on line 7—7 of Fig. 1.

There is shown and described herein the best known form of the invention. However, it will be understood that modifications and changes may be made within the scope of the invention without departing from the spirit thereof, the invention being measured by the appended claims and not by the details of the specification.

The invention relates to a method and apparatus wherein an article having a foam core or center contained within a flexible outer casing, jacket or integument is produced by folding a sheet or web of casing material to bring the edges together, depositing a measured charge of reactant materials onto the folded web of casing material, joining the edges of the casing material with the reactant materials therein, excluding substantially all of the air from the closed casing and supporting the casing while the reaction forming the foam core runs substantially to completion.

The reactant materials used in the practice of this invention may be selected from those known classes of compounds which will chemically foam or react, alone or in combination with others, with or without a catalyst or a gasifiable substance, so as to form a resilient foam material having a defined cellular structure.

In the form of the invention which will be particularly described herein, those known classes of reactants are chosen which form a polyurethane foam. These include polyesters or polyethers or kindred compounds, polyisocyanates, water, and if desired aliphatic amines as catalysts. Other suitable reactants possessing the aforementioned properties will occur to those skilled in the art.

Referring to the drawings, in the preferred form of the apparatus tank 1 contains the polyester, polyether or like compounds, the catalyst and water. The tank 2 contains a suitable isocyanate or polyisocyanate.

Examples of isocyanates which may be used in the practice of the invention, either alone, in isomeric ratio, or in mixtures thereof, include but are not limited to tolylene diisocyanates (TDI and TDI dimer), methylene bis-4-phenyl isocyanate, octa decyl isocyanate, alpha-naphthyl isocyanate, 1,5-naphthalene diisocyanate, dianisidene diisocyanate, and triphenyl methane tri-isocyanate (TTI).

The use of an amine to catalyze the reaction of the polyester or polyether resin with the isocyanate groups has been found to be desirable. Examples of which include but are not limited to triethylamine, tri-n-propylamine, tri-n-butylamine, tri-n-amylamine, dimethylaminoethanol and diethylaminoethanol.

The polyester or polyether, catalyst and water from tank 1, and the polyisocyanate from tank 2 are connected by suitable piping 4 having shut-off valves 5 to a pair of constant delivery metering pumps 6. The pumps 6 deliver the reactants, through check valves 8, to a combined mixing and charging means indicated generally by the numeral 10.

The combined mixing and charging means 10 is attached to a suitable base 11 and includes an upright stand 12 having a vertical bushing 14 extending downwardly therefrom to support a drive shaft 15. The drive shaft may be driven by a conventional pulley and belt arrangement 16 from a motor (not shown). The lower end of bushing 14 is threaded to permit attachment of a mixing chamber 18 having a mixing area 19 into which measured amounts of the reactants are discharged by the pumps 6. Attached to the lower end of the drive shaft 15 is a mixing bit 20 which is rotated upwardly as shown so as to ensure the intimate mixing, prior to discharge, of reactants necessary for production of satisfactory polyurethane foam.

The mixing bit 20 is preferably rotated in the range of from 600–2100 r.p.m. The optimum mixing speed is determined by the formulation of the reactants used and by the type of cellular structure desired. As the formulation or other variables are changed to result in a slower rate of reaction, higher mixing speeds can be tolerated. Conversely, as the rate of reaction is increased a lower mixing speed is necessary to produce a satisfactory foam.

Affixed to the underside of the mixing chamber 18 is a plate 21 having an opening 22 therein through which a charging spout 23 depends from the mixing chamber. The spout 23 has a tapered orifice 24 positioned below the mixing bit 20. The spout 23 has attached thereto a length of flexible rubber or plastic tubing 25 through which the mixture of unexpanded reactants 26 is discharged onto the preferably continuously moving sheet or web of casing material 30. The discharge end of the tubing 25 is positioned and held by a stirrup or bracket 27 affixed by a bolt and nut 28 to the plate 21. The stirrup 27 ensures that the reactant mixture 26 is charged onto the lowermost portion of the web 30.

The web or sheet to form the casing, or jacket used in the practice of the invention may be selected from those materials which in sheet or web form are flexible or slightly distensible, capable of being joined as by sealing or stitching. It may be impermeable to the reactant mixture, and not deleteriously affected by either the reactants per se or by the heat resulting from the exothermic nature of the foaming reaction. In one form of the invention which is described herein, the casing material 30 is a polyethylene film and the joining is accomplished by heat sealing. If desired, the polyethylene film may have printed thereon a decorative pattern. In an alternative form of the invention, the casing 30 could be a fabric material which has been sized or treated so as to possess the aforementioned properties and which would be joined by stitching or sewing. Other suitable materials possessing the aforesaid properties will occur to those skilled in the art.

The casing material 30 is supplied and folded by a means indicated generally by the numeral 32. Referring to Figs. 1 and 2, a supply roll 33 of the jacket material is adjustably secured between cones 34 and 35, which in turn are rotatably mounted on an axle 36. The inboard end of the axle 36 has a set screw collar 37 thereon which positions the axle in an inboard bearing bracket 38 affixed to and extending vertically of the base 11. The inboard cone 34 has a pulley-like flange 39 which frictionally engages a flat strap 40. One end of the strap 40 is fastened to the bracket 38 as at 41. The other end of the strap 40 has a buckle 42 to which is attached a counterweight 44. The weight 44 pulls the strap 40 downwardly within the flange 39 of the cone 34 so as to provide friction and back tension while the casing material 30 is being pulled through the apparatus. The outboard end of the axle 36 is fastened to the vertical flange of an angle iron bracket 45 fastened to the base 11.

As the casing material is led off the underside of the supply roll 33, it passes over an idler roller 46, rotating freely on a shaft 47 fastened to the bracket 45. The roller 46 is held on the shaft 47 by a bolt and washer arrangement 48. After passage over roller 46, the web of casing material passes beneath a folding plate 50. The folding plate is triangularly or wedge shaped and extends downwardly at preferably a 45° angle from a support bar 51 which is fastened to the vertical flange of the bracket 45.

The plate 50 causes the web 30 to assume a triangular shape with an ever narrowing apex, thus forming a fold 30A and bringing the outer edges 30B into close proximity with each other.

After moving past beneath the plate 50, the web 30 is led between a pair of vertical, rectangular posts 52 and 53 extending upwardly from a flange 54 mounted on the bracket 45. Post 53 is firmly affixed to the flange 54 by bolts 55. Post 52 is adjustable on the flange 54 by means of a bolt 56 so that it may be moved with relation to the vertical post 53. Attached to the top of post 52 is a bracket 57 on which an idler roller 58 is rotatably mounted. As the casing material passes between the posts 52 and 53 the edges 30B are brought into very close proximity. As the casing material is passed around the roller 58, the edges 30B are brought into actual contact with each other, thus completing the folding of the web. Though a preferred form of folding means 32 has been shown and described, it is apparent that other folding means could function equally as well in the practice of the invention.

After charging of the reactant mixture 26 onto the web 30, the edges 30B are sealed together to form a jacket or closed casing within which the reaction of the ingredient materials can chemically run to form a foam. The sealing means, indicated generally by the numeral 60, is shown as a conventional sealer for polyethylene film.

Referring to Figs. 1 and 3, the sealer 60 is driven by a motor 62 and conventional pulley and belt drive. The motor 62 is mounted on a base 63 which is an integral part of the sealer housing 64. The housing 64 is adjustably mounted on a stanchion 65 attached by a base flange 66 to the base 11. The vertical adjustment thus provided permits varying the width of the sealed edges 30B, thus varying the volume of the casing for any given width of casing material.

Actual joining of the edges 30B of the casing web is brought about by a pair of endless, resistance heated, stainless steel belts or tape 68. The belts are driven by sprockets 69 and rotate around sprockets 70. A pair of small sprockets 71 are provided for each belt 68 to regulate the tension of the belts, and thus the extent to which the edges 30B are forced together during the sealing operation. The entry end of the housing 64 is provided with curved entry guides 72 so that the web 30 will track evenly through the sealer 60. On the operator's side of the sealer, the housing 64 has mounted therein suitable switches 73 for regulating the heat supplied through the stainless steel tapes 68.

As shown, in addition to heat sealing the edges of the polyethylene web 30, the heat sealing means 60 is used to provide the traction required to pull the web off the supply roll 33 and through the folding and charging means. It is apparent that sealing means other than as shown and described could function equally as well in the practice of the invention. For example, traction could be supplied by a separate drive means mounted apart from the sealing means. Also, if sized or treated decorative fabric matreial were to be used as the casing material 30, the edges could be sealed using a sewing machine or other suitable apparatus.

The web of casing material 30 will have entrapped therein a certain amount of air. If this air were to remain in the closed casing while the reaction forming the foam ran to completion, the cellular structure of the foam would be unsatisfactory. This disadvantage is overcome by calculating the reactants such that rapid reaction thereof does not take place immediately upon charging, and by providing a means to exclude air from within the sealed casing.

Figure 8:
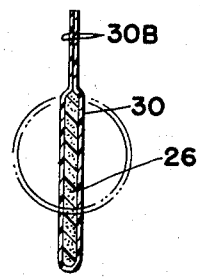
Fig. 8 is a view similar to Fig. 7, taken substantially on line 8—8 of Figs. 1 and 6.

Referring to Figs. 4 and 6, air is excluded from the sealed casing by a means designated generally by the numeral 80. As shown, the means 80 comprises a pair of vertical posts 81 affixed by bolts 82 to a bracket 83 attached to the base 11. One of the posts 81, shown to the left of Fig. 4, is adjustable with relation to the other by means of a bracket 84 and set screw 85. The posts are positioned so as to compress the sealed casing 30 so that the cross-sectional area or volume thereof is equal to or less than the amount of reactant material 26 present; thus forming the airtight "dam" of reactant material 26A, as shown in Fig. 6. The adjustment of the posts 81 enables the operator to control the cross-sectional area of the casing at the "dam" so that regardless of the volume of the casing or the extent to which the foaming reaction has progressed at this point, the "dam" will be sufficient to exclude air from the casing after it has passed this point without causing excessive backing up of the foam ahead of this point. It has been found that formation of the "dam" is facilitated by the provision of an adjustable bracket 88 to support the underside of the sealed casing as it passes the posts 81. Shortly after leaving the air excluding means, the sealed casing will, due to the progression of the reaction, assume in general the shape shown in Fig. 8.

After excluding air from within the closed casing, means indicated generally by the numeral 90 may be provided to receive and support the closed casing 30 while the reaction forming the foam runs to completion.

As shown in Figs. 3 and 5, a satisfactory supporting means may be provided by a tentering chain 92 suspended from and driven by sprockets such as at 93. Each link of chain 92 has a plate of small diameter pins 94 attached thereto. A suitable brush 95 mounted vertically above the base 11 is used to force the sealed edges of the casing 30 over the pins 94. The chain 92 may be as long as required to support the closed casing while the reaction forming the foam runs substantially to completion, whereupon the completed article is stripped from the chain.

Figure 9:
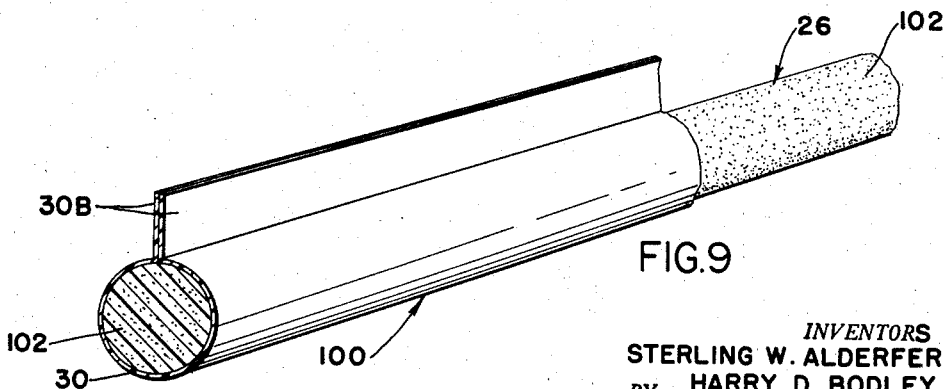
Fig. 9 is a perspective view of articles formed according to the invention.

Referring to Fig. 9, a resilient foam article according to the invention is indicated generally by the numeral 100. The reactant materials while within the closed jacket 30 have expanded equally in all directions to form a foam core 102 having a uniform cellular structure with a relatively small cross-sectional area. The article 100 may be used as a gasket material, the joined edges 30B providing a strip for fastening the gasket in place. Or, if desired, the edges 30B may be removed, leaving the foam core with a circumferential outer jacket. Finally, the core 102 may be used per se by completely removing or stripping the jacket 30. When formed within a casing having a smooth interior, particularly polyurethane foam formed within a polyethylene casing, the core 102 will have a smooth, planished exterior surface which is reflective to highlights and presents a pleasing appearance.

Other types of foaming materials which expand during foaming and are either time or heat setting may be substituted for the polyurethane foam, such, for example as vinyl resins having foaming agents or a gas, such as carbon dioxide incorporated therein.

While the process and apparatus have been described with great particularity in order to disclose the best known and preferred form of the invention, changes and modifications may be suggested to those skilled in the art. Whether the unexpanded reactants are deposited on the web of material before or after the edges are brought completely together is not material as the web may be partially folded when the reactants are deposited.

What is claimed is:

1. A process for producing a foam within a flexible casing, comprising the steps of, depositing a charge of reactants capable of forming said foam on a web of casing, folding said web with the reactants therein, joining the web edges to provide a foam tight seal, suspending said web by its joined edges, and continuing to suspend said web from said edges while the foam forming reaction runs substantially to completion.

2. A process for producing a foam within a flexible casing, comprising the steps of, moving a web of casing beneath a charging spout, depositing a charge of reactants capable of forming said foam through said spout onto said moving web, joining the web edges to provide a foam tight seal, suspending said web by its joined edges, and continuing to suspend said web from said edges while the foam forming reaction runs substantially to completion.

3. A process for producing a foam within a flexible casing, comprising the steps of, depositing a charge of reactants capable of forming said foam on a moving web of casing, folding said web with said reactants therein before there has been any significant foam forming reaction, joining the web edges immediately after folding to provide a foam tight jacket in the form of an elongated free hanging loop, momentarily reducing the cross-sectional area of the jacket to exclude air therefrom, and suspending said jacket from said edges while the foam forming reaction runs substantially to completion.

4. A process for producing a foam within a flexible casing, comprising the steps of, moving a web of casing beneath a charging spout, depositing a charge of reactants capable of forming said foam through said spout onto said moving web, folding said web with said reactants therein before there has been any significant foam forming reaction, joining the web edges immediately after folding to provide a foam tight jacket in the form of an elongated free hanging loop, momentarily reducing the cross-sectional area of the jacket to exclude air therefrom, and suspending said jacket from said edges while the foam forming reaction runs substantially to completion.

5. A process for the production of a chemically formed foam material, comprising the steps of, depositing a charge of reactants capable of forming said foam on a web of flexible material which is impervious to and not deleteriously affected by either said foam or reactants, folding said web with the reactants therein, joining the edges of said web to form a foam tight jacket, momentarily reducing the cross-sectional area of the jacket to exclude air therefrom, and suspending the jacket from said edges while the jacket becomes substantially tubular in cross-section as the foam forming reaction runs.

6. A process for the production of a chemically formed foam material, comprising the steps of, depositing a charge of reactants capable of forming said foam on a web of polyethylene film, folding said film with the reactants therein, sealing oposite edges of said web by heat and pressure to form a foam tight jacket, momentarily reducing the cross-sectional area of the jacket to exclude air therefrom, and suspending the jacket from said edges while the jacket becomes substantially tubular in cross-section as the foam forming reaction runs.

7. A process for the production of a polyurethane foam within a flexible casing, comprising the steps of, depositing a reactant mixture of polyesters, polyisocyanates and water on a web of flexible material which is impervious to and not deleteriously affected by said reactants, folding said web with said reactants therein before there has been any significant foam forming reaction, joining the web edges immediately after folding to provide a foam tight jacket in the form of an elongated free hanging loop, momentarily reducing the cross-sectional area of the jacket to exclude air therefrom and suspending said jacket from said edges while the foam forming reaction runs substantially to completion.

8. A process for the production of polyurethane foam, comprising the steps of, depositing a reactant mixture of polyesters, polyisocyanates and water on a web of polyethylene film, folding said film with the reactants therein, sealing opposite edges of said web by heat and pressure to form a foam tight jacket, momentarily reducing the cross-sectional area of the jacket to exclude air therefrom, and suspending the jacket from said edges while the jacket becomes substantially tubular in cross-section as the foam forming reaction runs.

9. Apparatus for the continuous production of a chemically formed foam material within a jacket of a flexible material comprising in combination, means for supplying a moving web of said flexible material, means for folding said web, means for depositing a charge of reactants forming said foam on the web, means subsequent to said depositing means for joining the edges of said web to form said jacket, means to reduce the cross-sectional area of the jacket to exclude air from said jacket, and means for supporting said jacket solely by its joined edges and free of any restraint while the foam forming reaction runs substantially to completion.

10. Apparatus for the production of a polyurethane foam within a jacket of polyethylene comprising in combination, means for continuously supplying a moving web of polyethylene, means for continuously depositing a reactant mixture of polyesters, polyisocyanates and water on the web, means for continuously folding said web to bring together the edges of said web, means for heat sealing the overlaid edges of said web to form a jacket, a compressing device for reducing the cross-sectional area of the jacket to exclude air therefrom, and a conveyor for continuously supporting said jacket solely by its sealed edges and free of any restraint while the foam forming reaction runs substantially to completion.

11. Apparatus for the continuous production of a chemically formed foam material within a jacket of a flexible material comprising in combination, means for supplying a moving web of said flexible material, means for folding said web, means for depositing a charge of reactants forming said foam on the web, means subsequent to said depositing means for joining the edges of said web to form said jacket, and means for supporting said jacket solely by its joined edges and free of any restraint while the foam forming reaction runs substantially to completion.

References Cited in the file of this patent

UNITED STATES PATENTS

| | | |
|---|---|---|
| 2,141,405 | Randall | Dec. 27, 1938 |
| 2,272,530 | Patterson | Feb. 10, 1942 |
| 2,280,405 | Frostad | Apr. 21, 1942 |
| 2,340,260 | Clunan | Jan. 25, 1944 |
| 2,385,229 | Patterson | Sept. 18, 1945 |
| 2,390,071 | Barnett | Dec. 4, 1945 |
| 2,668,323 | Johnson | Feb. 9, 1954 |
| 2,668,987 | Harris et al. | Feb. 16, 1954 |
| 2,718,105 | Ferguson et al. | Sept. 20, 1955 |
| 2,753,642 | Sullivan | July 10, 1956 |
| 2,767,461 | Lebold et al. | Oct. 23, 1956 |

FOREIGN PATENTS

| | | |
|---|---|---|
| 161,277 | Australia | Feb. 18, 1955 |